United States Patent [19]

McCloskey

[11] 3,941,078

[45] Mar. 2, 1976

[54] IRRIGATION SIGNALLING DEVICE

[76] Inventor: Edward W. McCloskey, 439½ Riverside Drive, Burbank, Calif. 91506

[22] Filed: Sept. 13, 1974

[21] Appl. No.: 505,730

[52] U.S. Cl.................. 116/118 A; 73/307; 73/322
[51] Int. Cl.².......................................... G01F 23/08
[58] Field of Search....... 116/118 A, 118 R; 73/307, 73/308, 322, 322.5, 171; 340/244 A

[56] References Cited
UNITED STATES PATENTS

| | | | |
|---|---|---|---|
| 1,451,056 | 4/1923 | Schindler | 116/118 A |
| 2,550,152 | 4/1951 | Kennedy | 116/118 R X |
| 2,565,423 | 8/1951 | Evans | 73/322 |
| 2,704,046 | 3/1955 | Moraga | 116/118 R |
| 3,370,468 | 2/1968 | Healy | 73/322 |
| 3,382,719 | 5/1968 | Villeneuve | 73/305 X |
| 3,673,587 | 6/1972 | Baruch | 73/322.5 X |

Primary Examiner—Richard C. Queisser
Assistant Examiner—Daniel M. Yasich
Attorney, Agent, or Firm—Whann & McManigal

[57] ABSTRACT

An irrigation signal which has a cylindrical body to receive a cylindrical elongated float, the body having an upper portion and a lower portion, the lower portion being adapted to extend below the bottom of the irrigation ditch in which it is installed in order to form a well in which irrigation water may enter in order to raise said float a substantial distance above the top of the ditch to signal that irrigation water has been present or is present in said ditch. The irrigation signal has a removable plug at the lower end of the body so that when the plug is in place irrigation water will be retained in the body and keep the float in a signalling position, or in which, when the plug is removed, the water will drain from the lower end of the body so that the signalling float will be in signalling position only when there is water in the irrigation ditch.

2 Claims, 6 Drawing Figures

IRRIGATION SIGNALLING DEVICE

BACKGROUND OF THE INVENTION

This invention relates to irrigation signalling means for use on farms or ranches, or wherever irrigation ditches are used and it is desired to know that irrigation water is being properly handled in the ditches. It is common practice to irrigate farms or orchards by digging long ditches. Water is introduced at one end of the ditch and flows throughout the entire length of the ditch in order to irrigate large areas. Farms and ranches may vary from a few acres to hundreds of acres. It is important to know that trees or plants or vines are being irrigated properly and the irrigator, therefore, must inspect the various irrigation ditches in order to be certain that water is or has been flowing through the ditches.

If an irrigator must visit each section of the property to determine the presence of irrigation water, considerable time would be required and also he might be required to climb through the plantings and destroy a portion of the crop being grown.

It has been the practice to provide a number of devices which will signal the presence of water in an irrigation ditch, these signals being positioned so that they can be observed from a road or other distant point. These devices for the most part include tripping devices and extend considerable distances above the ground and are subject to being knocked over or blown over, and those with which applicant is familiar are unsatisfactory.

Irrigation signals which applicant is familiar with are shown in the following prior art patents:

| De Meyer | 1,267,061 |
| Schindler | 1,451,056 |
| Garrison | 2,082,763 |
| Cox | 2,584,425 |
| Due | 2,594,885 |
| Lubin | 3,359,799 |

SUMMARY OF THE INVENTION

It is an object of my invention to provide an irrigation device which will signal the presence of water while water is flowing through the ditch, or which may be arranged to indicate that water has flowed through the ditch.

It is an object of my invention to provide an irrigation device in which there is a body which has a lower portion which projects downwardly a distance below the bottom of the ditch in order to form a well in which the signal float is positioned, and in which, when said well is filled with water from the irrigation water flowing through the ditch, the float will be raised a considerable distance to give an adequate visual signal.

It is an object of my invention to provide a structure which is of simple design, economical and foolproof, nothing to get out of order, and can be easily installed and removed.

DESCRIPTION OF ONE FORM OF THE INVENTION

Figure 1:
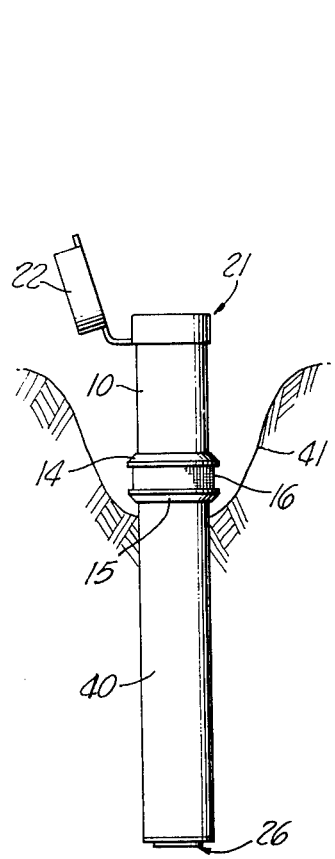
FIG. 1 illustrates my invention installed in an irrigation ditch with the parts in non-signalling position.

As shown in the drawings, the numeral 10 represents a cylindrical elongated body having a cylindrical float chamber 11 therein. Intermediate of the ends of the body are water entrance openings 12 arranged around the circumference of the body 10. Positioned around the body 10 are upper and lower shoulders 14 and 15 which protect a multi-layer screen 16 selected for preventing foreign matter from clogging the openings 12. At the upper end of the body 10 is an annular shoulder or stop 18 which acts as a stop for the signalling float 19, as will be explained during the course of this description.

The annular shoulder 18 is formed on a cylindrical flange 20 which fits in the end of the body 10 and forms the part of a fixture 21 which supports a cover or cap 22 by means of a flexible strip 23.

Figure 3:
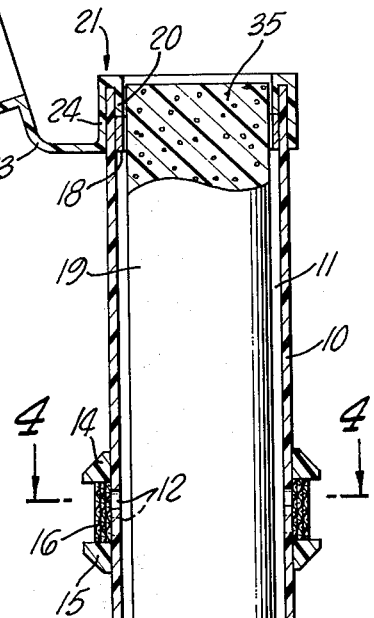
FIG. 3 is an enlarged vertical sectional view showing the irrigation signal of my invention.
Figure 5:
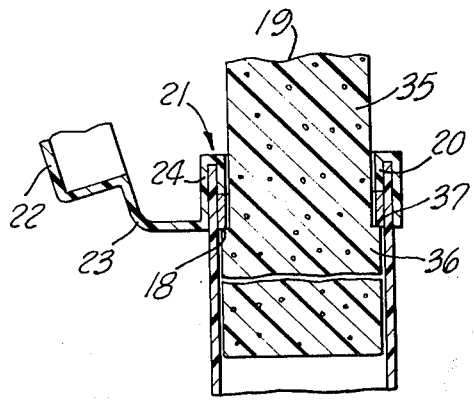
FIG. 5 is an enlarged fragmentary sectional view showing the manner in which the float is restrained from being extended from the body beyond a predetermined distance.
Figure 4:
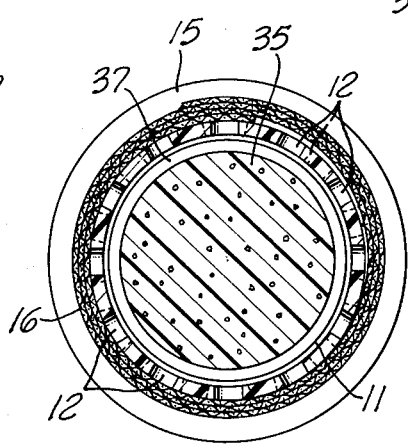
FIG. 4 is an enlarged sectional view taken on line 4—4 of FIG. 3.

The fixture 21, as is shown in FIGS. 3 and 5, has a pair of cylindrical flanges, one of which is 20 and the other of which is 24, these flanges providing an intermediate space into which the upper end of the body 10 extends.

At the lower end of the body 10 is a lower closure 26 which is of smaller diameter than the float chamber 11 and is in engagement with a lower radial flange 27, as shown at the bottom of FIG. 3.

The opening 28 formed by the flange 27 is of smaller diameter than the diameter of the chamber 11. The cylindrical wall 29 of the closure 26 is of the same diameter as the opening 28 and provides an annular space 30 which surrounds the closure 26. The wall 29 of the closure 26 has an opening 32 which communicates with the annular space 30. This opening 32 may be closed by a removal plug 33.

The signalling non-articulated float 19 is cylindrical and has an upper part 35 and a lower part 36, the lower part being of larger diameter than the part 35 in order to form an annular shoulder 37 which, when the float is raised, as shown in FIG. 5, will engage the shoulder 18 and thus prevent further movement of the float 19 in an upward direction.

Figure 6:
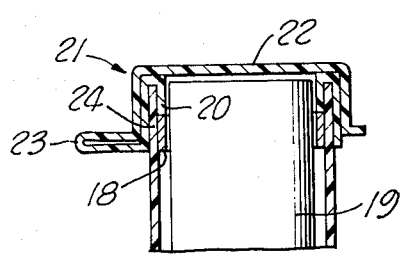
FIG. 6 is a fragmentary sectional view of the upper end of the body showing a closure cap in place.

When the signal is not in use the cap or cover 22 may be in a closed position, as shown in FIG. 6. When the signal is to be used and is installed in a ditch the cap may be in an open position as shown in FIGS. 1, 2, 3 and 5.

The irrigation signal is installed as shown in FIG. 1. It may or may not be necessary to dig a pilot hole, depending upon the hardness of the earth. The irrigation signal is installed with the lower part 40 extending well below the bottom of the ditch 41. The lower flange 15 may act as a stop or a gauge for determining the distance that the lower part 40 extends below the ditch bottom. This lower portion 40 of the body 10 forms a well and when there has been or is no water in the ditch, the float will rest in a lowered position, as shown in FIG. 3, with a greater part of the float residing in the well.

It is preferable that the upper end of the body be above the water level in the ditch so as to protect the float 19 from the flow of water. Because of the well which enables the float to be made quite long, the float may be raised a considerable distance with respect to the depth of the ditch, thereby giving a readily observable signal.

Figure 2:
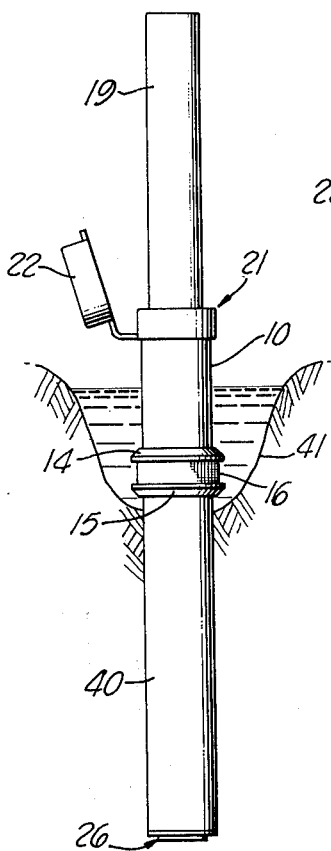
FIG. 2 is a similar view but showing irrigation water in the ditch and the signalling float in a raised position.

When water flows in the ditch it will pass through the screen 16 and openings 12 into the body 10. The flow of water will be substantially greater than the flow of water which would flow from the bottom of the body if the opening 32 were open, because of the relative size of the opening 32 and openings 12. Therefore, water will accumulate and as the well is filled the float will move upward from non-signalling position, as shown in FIGS. 1 and 3, into signalling position, as shown in FIG. 2.

If the plug 33 is not in place when the flow of irrigation water is stopped and the level subsides, water will drain through the opening 32 into the ground and the signal will return to lowered position. When the plug 33 is thus removed, the signal will signal the presence of water only when water is flowing in the irrigation ditch and during that period of time requiring the water to drain from the lower end of the well.

The device may also be used with the plug 33 in place and this will retain the water in the well even after there is no irrigation water in the ditch and the signal will be retained in signalling position so that the irrigator, when observing the irrigation signal will know that even though water is not in the ditch at that time that previously thereto there has been water in the ditch and irrigation has been proper. When the invention is so used, of course, the plug must be removed and the water drained out in order that the signalling float may be returned to its retracted position.

I claim:

1. An irrigation signalling device adapted to be installed in an irrigation ditch for signalling the presence of water therein, the combination of:
   a. an elongated hollow body providing an elongated float chamber therein, said body being adapted to be installed in an irrigation ditch, and having a lower portion adapted to extend downwardly from the bottom of the ditch to form a well therebelow, and having an upwardly extending portion which extends upwardly from the lower part of said ditch;
   b. entrance opening means provided in said body and located near the lower portion of said ditch when said body is installed in the ditch for permitting irrigation water to enter the well of said float chamber of said body and selectively excluding foreign matter; and
   c. a non-articulated elongated float is said body having a lower portion normally positioned in said well and an upper portion normally positioned in the upper part of said body, said float being adapted to move upwardly as a single element, and its upper end to extend a predetermined distance from the upper end of said body when water enters said float chamber, the projecting upper end of said float signalling the presence of water in said irrigation ditch.

2. A combination as defined in claim 1 in which there is stop means cooperating between said body and a bottom portion of the lower portion of said float to control the predetermined distance said float may project upwardly from said body and in which the lower end of said well is open so that when said irrigation ditch becomes empty water and any sediment therein may float downwardly and outwardly through the bottom opening of said well.

* * * * *